March 19, 1968  K. E. PERRY  3,374,434
INDUCTIVE COUPLING APPARATUS FOR USE IN COUPLING TO UNDERWATER
ELECTRIC SYSTEMS AND THE LIKE
Filed Sept. 9, 1965
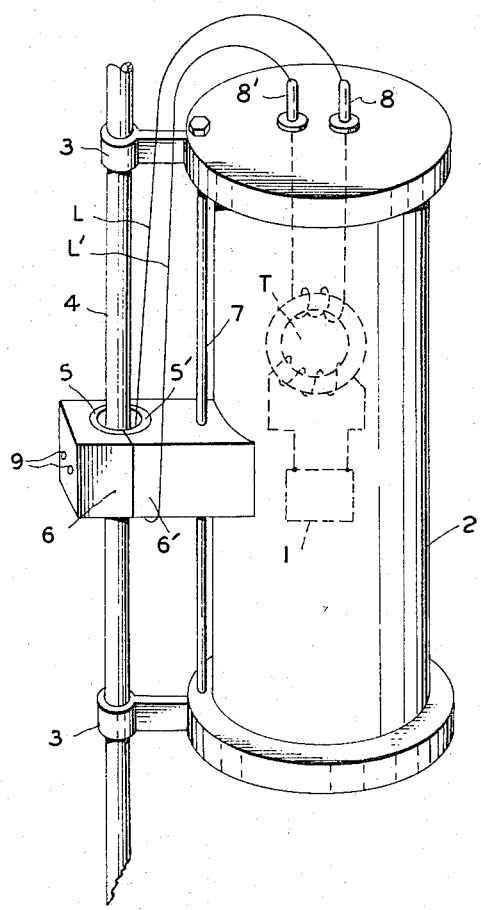
INVENTOR
KENNETH E. PERRY
BY *Rines and Rines*
ATTORNEYS 3,374,434
INDUCTIVE COUPLING APPARATUS FOR USE IN COUPLING TO UNDERWATER ELECTRIC SYSTEMS AND THE LIKE
Kenneth E. Perry, Wayland, Mass., assignor to Geodyne Corporation, Waltham, Mass., a corporation of Massachusetts
Filed Sept. 9, 1965, Ser. No. 486,112
6 Claims. (Cl. 324—127)

ABSTRACT OF THE DISCLOSURE

In an apparatus for inductively coupling a multiterminal electric system, disposed in a water-tight housing, to an underwater conductive-cable transmission line for the electric system, from which cable the housing is mechanically supported in the water, electrical connection between the electric system and the cable is established by means of a conductive loop that is connected between two terminals of the electric system, the cable and the loop being supported in an annulus that is formed by a two-part magnetic core one of the parts of which is mechanically supported by the housing and the other part of which is detachably secured to the said one part for the purpose of facilitating detachably mounting the cable and the loop in the annulus, the cable and the loop, however, being out of electrical contact with the core.

---

The present invention relates to inductive coupling apparatus, being more particularly directed to such problems as, for example, the inductive coupling of an electric system contained within a closed housing to a conductive underwater or similar cable that may support the housing and serve as a transmission line to or from the electric system, as well.

In systems of this character, such inductive coupling has been effected with the aid of annular magnetic cores upon which field-producing coils have been pre-wound and through which the cable is passed, the coils being connected to the system within the housing by external connections. After extended use in sea water and the like, however, the core faces rust and must be replaced, requiring not only extensive reassembly of the apparatus, but the necessity for substituting another relatively expensive pre-wound structure. In accordance with the present invention, on the other hand, the necessity for pre-wound cores is entirely eliminated and the substitution and placement of new cores is greatly simplified and facilitated through, in summary, the use of a novel simple loop coupling readily applicable to a two-part core structure.

An object of the invention, thus, is to provide a new and improved, greatly simplified and less costly inductive coupling structure particularly suited for underwater and similar applications.

A further object is to provide a novel coupling structure of more general utility, as well.

Other and further objects will be later described and more particularly pointed out in the appended claims.

The invention will now be described in conjunction with the accompanying drawing, the single figure of which is an isometric view of a preferred embodiment.

Referring to the drawing, a sensing, monitoring or other instrument comprising an electric system is shown in dotted lines at 1 contained within a water-tight closed cylindrical housing 2 and terminally clamped at 3 to an insulation-covered metal strand armored conductive cable 4 that serves as a part of the signal carrying transmission line system in completing the circuit to carry signals to or from the system 1, as is well known. The complete transmission circuit may extend, for example, from the sea, along the insulated cable 4 through the vessel monitoring equipment and back to the sea.

In accordance with the invention, an annular magnetic core (preferably cylindrical) is formed in two parts 5 and 5' carried in two separable block sections 6 and 6' of non-magnetic material, such as aluminum or plastic. The part 6'–5' is mounted upon the housing 2 by a support rod or rods 7. A simple loop (or loops) of insulation-covered wire is then extended at L from an external water-tight terminal 8 through the opening of the core part 5' adjacent the cable 4 and thence back at L', outside the block 6', to a second terminal 8'. The other part 6–5 may then be connected or clamped to the part 6'–5', as by screws 9, completing the core 5–5' and enveloping the cable 4 passing through the core opening, out of electrical contact with its walls. The insulation of the loop L prevents electrical contact with both the cable 4 and the core 5–5' but enables inductive coupling to the adjacent portion of the cable 4 passing through the core.

Thus, only the inexpensive core itself need be replaced if it rusts merely by separating block parts 6 and 6', and without the previously required replacement of expensive pre-wound cores. The use of the loop L–L', moreover, enables a stronger and longer-lasting wire to be used than with the pre-wound core structure windings. The facile attachment to couple to the cable is, of course, evident.

Since the loop coupling to the cable 4 is not as great as can be attained with multi-turn pre-wound cores, however, the overall coupling to the system 1 may be increased with a step-up transformer or similar device T interposed between terminals 8, 8' and the system 1 within the housing 2.

Further modifications will also occur to those skilled in the art and all such are considered to fall within the scope and spirit of the invention as defined in the appended claims.

What is claimed is:

1. Apparatus for inductively coupling a conductive cable to a multi-terminal electric system contained within a closed housing mounted adjacent a predetermined region of the cable, that comprises, annular magnetic core means through the opening of which a portion of the cable at the said predetermined region passes with the core enveloping but held out-of-contact with the cable, and conductive loop means extending from one terminal of the electric system external to the housing and through the core opening adjacent the said portion of the cable, but out of electrical contact with the core and cable, and thence back outside the core to another terminal of the system, thereby inductively coupling the system and cable, said core being disposed in a non-magnetic block mounted upon the housing, said block and said core disposed therein being in two separate parts, one of which is mountable upon the housing to enable positioning of the cable and loop means, and the other of which is securable to the said one part to complete the envelopment of the cable by the core.

2. Apparatus as claimed in claim 1 and in which the electric system is provided with means connected with the said terminals within the said housing to increase the overall coupling between the cable and the system.

3. Apparatus as claimed in claim 2 and in which the coupling increasing means comprises a step-up transformer.

4. Apparatus as claimed in claim 1 and in which the said loop is covered with insulation.

5. Electrical apparatus comprising a conductive cable, an electric system contained within a closed water-tight housing mounted on said cable adjacent a predetermined region thereof and provided with a pair of terminals for external electrical connections to said system through a wall of said housing, annular magnetic core means supported on the housing entirely externally thereof and having an opening through which a portion of the cable at the said predetermined region passes with the core enveloping but held out-of-contact with the cable, and conductive loop means comprising a continuous wire extending from one of said terminals externally of the housing and through the core opening adjacent the said portion of the cable, but out of electrical contact with the core and cable, and thence back outside the core to the other of said terminals, thereby inductively coupling the system and cable.

6. Apparatus for inductively coupling a multi-terminal electric system, disposed in a water-tight housing, to an underwater conductive-cable transmission line for the electric system, the said apparatus comprising means for mechanically supporting the housing in the water from the cable in a position adjacent to a predetermined region of the cable, and means for establishing electrical connection between the electric system and the cable comprising a continuous wire conductive loop that is connected between two terminals of the electric system through a wall of said housing and extends externally of said housing, the cable and the loop being supported adjacent to the predetermined region and extending through and out of electrical contact with a two-part annular magnetic core, one of the parts being mechanically supported on the housing in the neighborhood of the predetermined region, and the other part being detachably secured to the said one part, whereby the cable and the loop may be readily separated from the core.

References Cited
UNITED STATES PATENTS

| | | | |
|---|---|---|---|
| 2,146,555 | 2/1939 | Arey | 324—127 |
| 2,295,929 | 9/1942 | Melville et al. | 324—127 X |
| 2,375,591 | 5/1945 | Schweitzer, Jr. | 336—175 X |
| 3,154,757 | 10/1964 | Hannon | 336—175 |

LARAMIE E. ASKIN, *Primary Examiner.*

T. J. KOZMA, *Assistant Examiner.*